(12) United States Patent
Mochida

(10) Patent No.: US 7,408,468 B2
(45) Date of Patent: Aug. 5, 2008

(54) APPARATUS FOR COMMUNICATION WITH ARTICLE HAVING A WIRELESS TAG

(75) Inventor: Sadayoshi Mochida, Numazu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 213 days.

(21) Appl. No.: 11/362,619

(22) Filed: Feb. 27, 2006

(65) Prior Publication Data

US 2006/0220860 A1    Oct. 5, 2006

(30) Foreign Application Priority Data

Mar. 16, 2005    (JP)    ............... 2005-075303

(51) Int. Cl.
*G08B 13/14*    (2006.01)
(52) U.S. Cl. .................... 340/572.7; 343/880
(58) Field of Classification Search ............. 340/572.1, 340/572.7, 10.1, 10.51; 235/439–440; 343/880–883, 343/878
See application file for complete search history.

(56) References Cited

U.S. PATENT DOCUMENTS 6,641,042 B1 * 11/2003 Pierenkemper et al. ... 235/462.01

2005/0171854 A1 * 8/2005 Lyon .................... 705/24
2005/0218219 A1 * 10/2005 Sano et al. ............... 235/383

FOREIGN PATENT DOCUMENTS

JP    2000-198505    7/2000

* cited by examiner

*Primary Examiner*—Thomas J Mullen, Jr.
(74) *Attorney, Agent, or Firm*—Pearne & Gordon LLP

(57) ABSTRACT

An apparatus according to an aspect of the invention includes: a first table and a second table on which an article with an RFID tag may be placed; a retaining mechanism for selectively retaining the first table and the second table in a state in which the second table is placed on the first table and in a state in which the first table and the second table are apart from each other vertically by a specified distance; a first article detector and a second article detector disposed on the upper surface of the first table and the upper surface of the second table, respectively, for detecting that the article has been placed; and an antenna communicating with the RFID tag, with the directivity aimed upward when the second article detector has detected the article, and with the directivity aimed downward when the first article detector has detected the article.

12 Claims, 3 Drawing Sheets

APPARATUS FOR COMMUNICATION WITH ARTICLE HAVING A WIRELESS TAG

CROSS-REFERENCE TO RELATED APPLICATION

This application is based upon and claims the benefit of priority from prior Japanese Patent Application No. 2005-75303, filed on Mar. 16, 2005, the entire contents of which are incorporated herein by reference.

BACKGROUND OF THE INVENTION

1. Field of the Invention

The present invention relates to apparatuses for placing articles with radio-frequency-identification (RFID) tags and communicating with the RFID tags.

2. Description of the Related Art

Various systems have been developed to communicate with RFID tags stuck to articles to transfer information. It is desirable for apparatuses for reading and writing RFID tags stuck to articles and having an antenna for communicating with the RFID tags with the minimum electric power.

However, there are various relationships between the directivity of antennas and RFID tags stuck to articles. Accordingly, a large amount of power is required to constantly provide preferable communication.

SUMMARY OF THE INVENTION

The invention has been made in consideration of the problems of the related art. Accordingly, an advantage of the present invention is to provide an apparatus for placing an article with an RFID tag, which is capable of communicating with the RFID tag efficiently with low power.

To achieve the above advantage, one aspect of the present invention is to provide an apparatus for placing an article with an RFID tag. The apparatus includes: a first table and a second table on which an article with an RFID tag is to be placed; a retaining mechanism for selectively retaining the first table and the second table in a state in which the second table is placed on the first table and in a state in which the first table and the second table are apart from each other vertically by a specified distance; a first article detector and a second article detector disposed on the upper surface of the first table and the upper surface of the second table, respectively, for detecting that the article has been placed; and an antenna communicating with the RFID tag, with the directivity aimed upward when the second article detector has detected the article, and with the directivity aimed downward when the first article detector has detected the article.

An aspect of the invention has an advantage of providing an apparatus for placing an article with an RFID tag capable of communicating with the RFID tag efficiently with low power.

DETAILED DESCRIPTION OF THE INVENTION

Figure 1A:
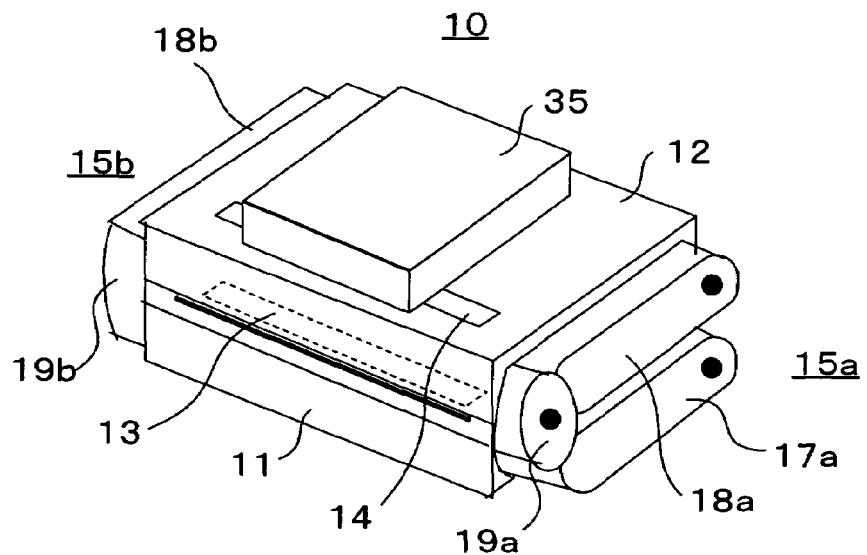
FIG. 1A is a perspective view of an apparatus for placing an article with an RFID tag according to an embodiment of the invention, showing a state in which two tables are placed one on another.

An embodiment of the invention will be described hereinbelow with reference to the drawings.

FIGS. 1A to 1C, and FIG. 2 show a structural example of an apparatus for placing an article with an RFID tag having a patch antenna as an antenna of a reader and writer, according to an embodiment of the invention.

The RFID-tag mount apparatus 10 includes a first table 11 and a second table 12 on which articles may be placed, a first article detector 13 disposed on the top of the first table 11, a second article detector 14 disposed on the top of the second table 12, foldable mechanisms 15a and 15b disposed on the sides of the first and second tables 11 and 12, and retaining the first and second tables 11 and 12 selectively in a state in which the second table 12 is placed on the first table 11 and in a state in which the tables 11 and 12 are vertically separated; and a patch antenna 16 disposed under the second table.

The bent mechanism 15a includes rod-like members 17a and 18a and a hinge 19a for rotatably connecting the members 17a and 18a at the ends. The bent mechanism 15b includes rod-like members 17b and 18b and a hinge 19b for rotatably connecting the members 17b and 18b at the ends.

Figure 1B:
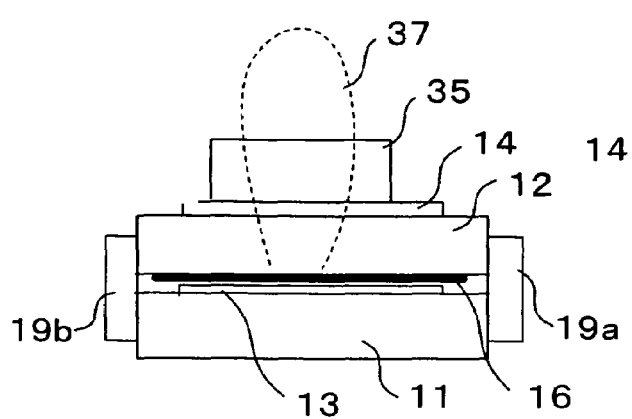
FIG. 1B is a front view thereof.
Figure 1C:
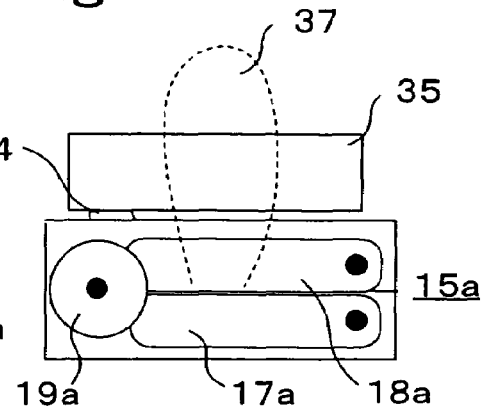
FIG. 1C is a side view thereof.
Figure 2A:
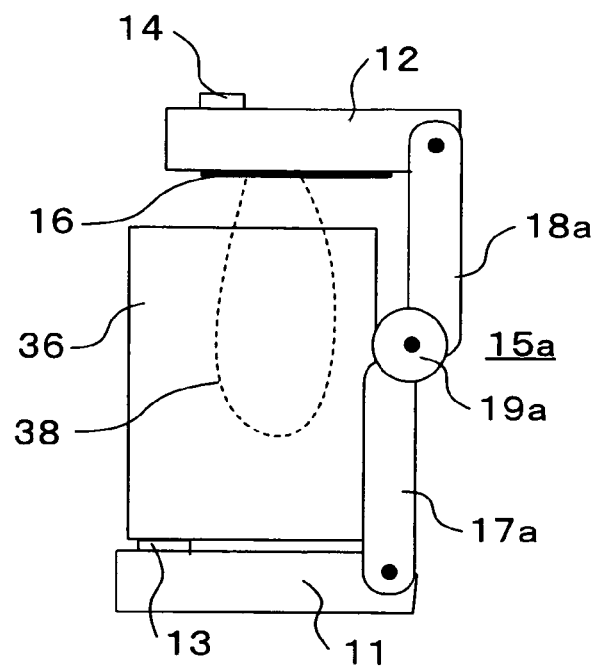
FIG. 2A is a side view of the apparatus for placing an article with an RFID tag according to an embodiment of the invention, showing a state in which two tables are placed apart from each other.
Figure 2B:
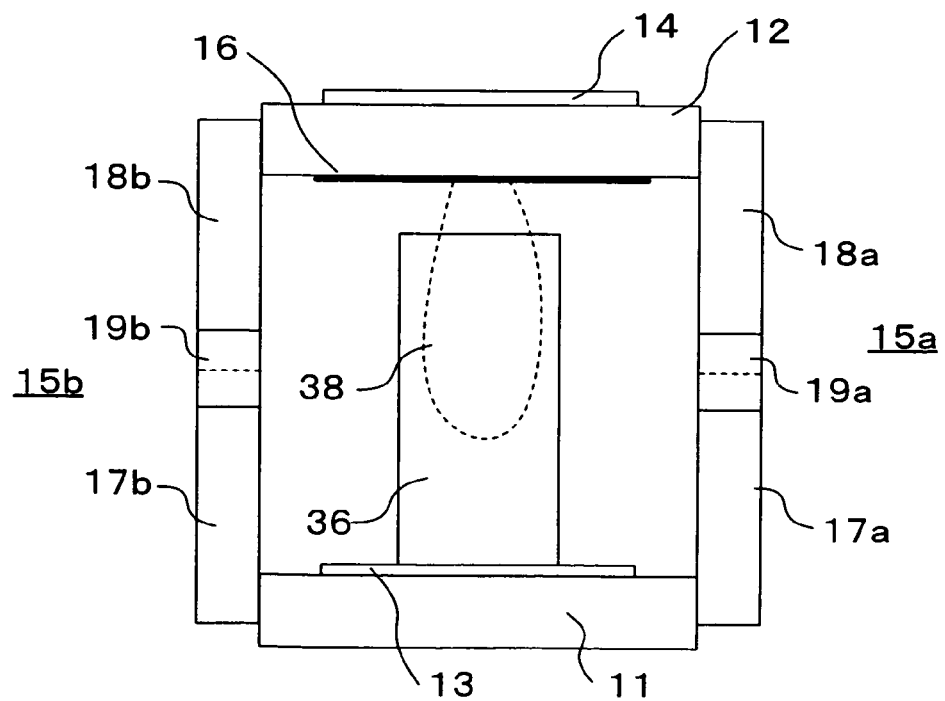
FIG. 2B is a front view thereof.

FIGS. 1A, 1B, and 1C show a state in which the bent mechanisms 15a and 15b are bent, that is, a state in which the rod-like members 17a, 18a, 17b, and 18b are folded around the shafts 19a and 19b, respectively, to place the second table 12 on the first table 11. FIGS. 2A and 2B show a state in which the bent mechanisms 15a and 15b are straightened, that is, a state in which the rod-like members 17a, 18a, 17b, and 18b are straightened around the shafts 19a and 19b, respectively, to vertically separate the first table 11 and the second table 12 from each other.

Figure 3:
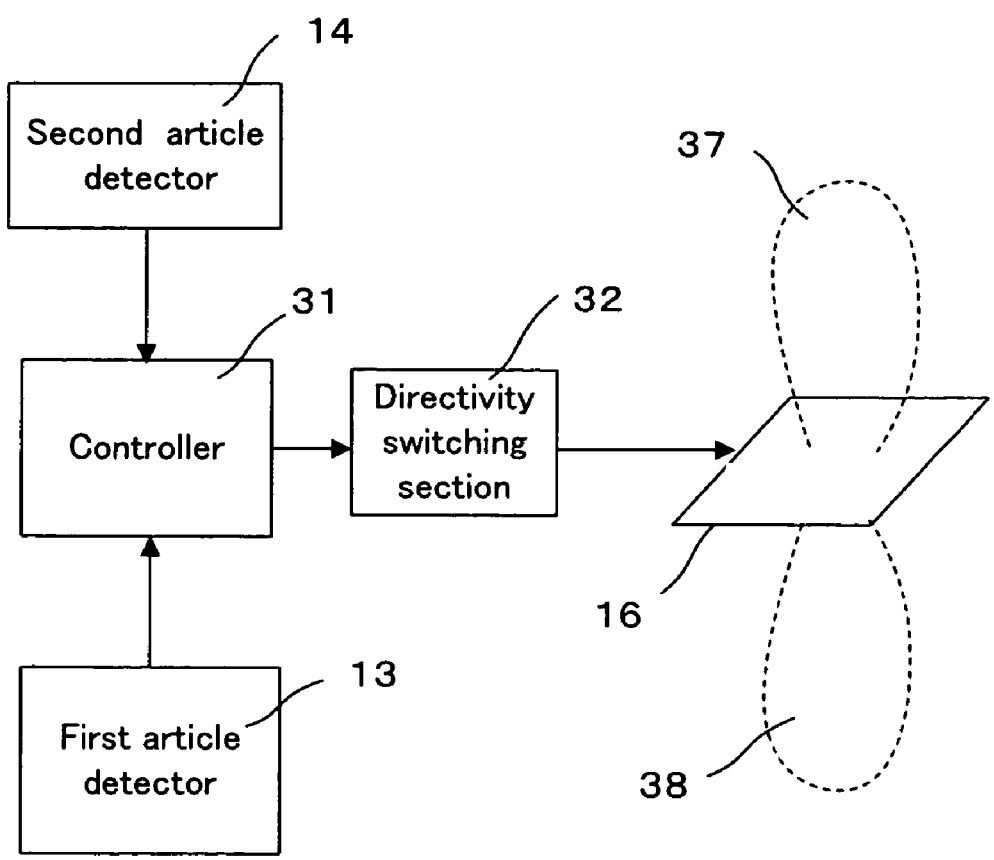
FIG. 3 is an explanatory diagram of the electrical structure of an apparatus for placing an article with an RFID tag, in an embodiment of the invention.

FIG. 3 shows the electrical structure of the embodiment. The output of the first article detector 13 and the output of the second article detector 14 are input to a controller 31. The output of the controller 31 is input to a directivity switching section 32. The output of the directivity switching section 32 is input to the patch antenna 16.

As shown in FIG. 1A, when an article 35 with an RFID tag (not shown) is placed on the second table 12, the second article detector 14 detects that the article has been placed, and sends a signal indicative of the fact to the controller 31. Upon receiving the signal indicative of that the article has been placed, the controller 31 sends a directivity control signal for bringing the directivity upward to the directivity switching section 32. The directivity switching section 32 then drives the patch antenna 16 in response to the control signal so as to provide an upward directivity 37.

On the other hand, as shown in FIG. 2A, when the bent mechanisms 15a and 15b are straightened to separate the second table 12 to a position above the first table 11, an article 36 is placed on the first table 11, the first article detector 13 detects that the article 36 has been placed, and sends a signal indicative of the fact to the controller 31 shown in FIG. 3. The controller 31 sends a directivity control signal for bringing the directivity downward to the directivity switching section 32. The directivity switching section 32 then drives the patch antenna 16 in response to the control signal so as to provide a downward directivity 38.

For example, when a document file of large number of sheets of paper each having an RFID tag on the top is placed as the article 36, as shown in FIGS. 2A and 2B, the patch antenna 16 is located above the article, so that its directivity is aimed downward, thus allowing efficient and low-power communication with the RFID tags.

The embodiment has been described for the case in which a patch antenna is used as the antenna of the reader and writer. The use of the patch antenna offers the advantage of facilitating switching between upward directivity and downward directivity. However, the antenna for use in the invention is not limited to this type of antenna, but may be any other antennas that can switch between the directivity forward and downward.

While the embodiment has been described for the case in which an antenna is disposed on the lower surface of the upper second table, the antenna may be disposed on the upper surface of the second table. The article detector may be either a pressure sensor that detects articles with pressure or an optical sensor that detects articles optically from the interception of light.

What is claimed is:

1. An apparatus for communicating with an article, the article having a radio-frequency-identification (RFID) tag, the apparatus comprising:
   a first table and a second table on which an article with an RFID tag may be placed;
   a retaining mechanism for selectively retaining the first table and the second table in a state in which the second table is placed on the first table and in a state in which the first table and the second table are apart from each other vertically by a specified distance;
   a first article detector and a second article detector disposed on the upper surface of the first table and the upper surface of the second table, respectively, for detecting that the article has been placed; and
   an antenna communicating with the RFID tag, with the directivity aimed upward when the second article detector has detected the article, and with the directivity aimed downward when the first article detector has detected the article.

2. The apparatus according to claim 1, wherein the antenna is a patch antenna.

3. The apparatus according to claim 2, wherein the retaining mechanism is disposed on the side of the first table and on the side of the second table, the retaining mechanism having two rod members and a shaft that supports the rod members at the end of each of the rod members.

4. The apparatus according to claim 3, wherein the antenna is disposed on the lower surface of the second table.

5. The apparatus according to claim 4, wherein the first article detector and the second article detector are pressure sensors that detect the article with pressure applied.

6. The apparatus according to claim 4, wherein the first article detector and the second article detector are optical sensors that detect the article optically.

7. An apparatus for communication with an article, the article having an RFID tag, the apparatus comprising:
   a first table and a second table on which an article with an RFID tag may be placed;
   a retaining mechanism for selectively retaining the first table and the second table in a state in which the second table is placed on the first table and in a state in which the first table and the second table are apart from each other vertically by a specified distance;
   a first article detector and a second article detector disposed on the upper surface of the first table and the upper surface of the second table, respectively, for detecting that the article has been placed;
   an antenna communicating with the RFID tag; and
   a directivity switching section that aims the directivity of the antenna upward when an article has been detected by the second article detector, and aims the directivity downward when an article has been detected by the first article detector.

8. The apparatus according to claim 7, wherein the antenna is a patch antenna.

9. The apparatus according to claim 8, wherein the retaining mechanism is disposed on the side of the first table and on the side of the second table, the retaining mechanism having two rod members and a shaft that supports the rod members at the end of each of the rod members.

10. The apparatus according to claim 9, wherein the antenna is disposed on the lower surface of the second table.

11. The apparatus according to claim 10, wherein the first article detector and the second article detector are pressure sensors that detect the article with pressure applied.

12. The apparatus according to claim 10, wherein the first article detector and the second article detector are optical sensors that detect the article optically.

* * * * *